(12) United States Patent
Sato

(10) Patent No.: US 9,818,495 B2
(45) Date of Patent: Nov. 14, 2017

(54) CONTAINMENT VESSEL AND NUCLEAR POWER PLANT

(75) Inventor: Takashi Sato, Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 1157 days.

(21) Appl. No.: 13/988,966

(22) PCT Filed: Sep. 14, 2011

(86) PCT No.: PCT/JP2011/005182
§ 371 (c)(1),
(2), (4) Date: May 22, 2013

(87) PCT Pub. No.: WO2012/073411
PCT Pub. Date: Jun. 7, 2012

(65) Prior Publication Data
US 2013/0259184 A1  Oct. 3, 2013

(30) Foreign Application Priority Data
Nov. 29, 2010  (JP) .................................. 2010-264968

(51) Int. Cl.
*G21C 13/10*  (2006.01)
*G21C 13/00*  (2006.01)
(Continued)

(52) U.S. Cl.
CPC .............. *G21C 13/00* (2013.01); *G21C 9/004* (2013.01); *G21C 9/008* (2013.01); *G21C 9/06* (2013.01);
(Continued)

(58) Field of Classification Search
CPC ................................ G21C 13/10; G21C 13/00
(Continued)

(56) References Cited

U.S. PATENT DOCUMENTS 3,865,688 A * 2/1975 Kleimola ................. G21C 9/00
376/293
4,518,561 A * 5/1985 Hista ...................... G21C 13/00
376/293
(Continued)

FOREIGN PATENT DOCUMENTS

CN  1141716 C  3/2004
JP  58-196489 A  11/1983
(Continued)

*Primary Examiner* — Jack W Keith
*Assistant Examiner* — Daniel Wasil
(74) *Attorney, Agent, or Firm* — Foley & Lardner LLP

(57) ABSTRACT

A containment vessel has an inner shell covering a reactor pressure vessel and an outer shell forming an outer well which is a gas-tight space covering the horizontal outer periphery of the inner shell. The inner shell has a first cylindrical side wall surrounding the horizontal periphery of the reactor pressure vessel, a containment vessel head which covers the upper part of the reactor pressure vessel, and a first top slab connecting in a gas-tight manner the periphery of the containment vessel head and the upper end of the first cylindrical side wall. The outer shell has a second cylindrical side wall surrounding the outer periphery of the first cylindrical side wall, and also has a second to slab connecting in a gas-tight manner the vicinity of the upper end of the second cylindrical side wall and the first cylindrical side wall.

12 Claims, 6 Drawing Sheets

(51) Int. Cl.
*G21C 9/004* (2006.01)
*G21C 9/008* (2006.01)
*G21C 9/06* (2006.01)
*G21C 15/18* (2006.01)
*G21F 9/02* (2006.01)

(52) U.S. Cl.
CPC .............. *G21C 13/10* (2013.01); *G21C 15/18* (2013.01); *G21F 9/02* (2013.01); *Y02E 30/40* (2013.01)

(58) Field of Classification Search
USPC ........................................ 376/293, 282, 310
See application file for complete search history.

(56) References Cited

U.S. PATENT DOCUMENTS

| | | | |
|---|---|---|---|
| 4,797,250 A * | 1/1989 | Moreau | G21C 13/024 376/293 |
| 5,011,652 A * | 4/1991 | Tominaga | G21C 15/18 376/293 |
| 5,215,708 A * | 6/1993 | Fennern | G21C 15/18 376/293 |
| 5,272,737 A | 12/1993 | Fujii et al. | |
| 5,295,169 A | 3/1994 | Tominaga et al. | |
| 5,295,170 A | 3/1994 | Schulz | |
| 5,309,489 A | 5/1994 | Tate et al. | |
| 5,337,336 A * | 8/1994 | Lin | G21C 9/00 376/306 |
| 6,173,027 B1 | 1/2001 | Saito et al. | |
| 7,684,535 B2 | 3/2010 | Hirako | |
| 2007/0092053 A1* | 4/2007 | Sato | G21C 13/022 376/283 |
| 2008/0037696 A1* | 2/2008 | Hirako | G21C 13/00 376/283 |
| 2009/0323884 A1* | 12/2009 | Sato | G21C 13/00 376/283 |

FOREIGN PATENT DOCUMENTS

| | | |
|---|---|---|
| JP | 61-196196 A | 8/1986 |
| JP | 63-212892 A | 9/1988 |
| JP | 04-125495 A | 4/1992 |
| JP | 04-290994 A | 10/1992 |
| JP | 06-258479 A | 9/1994 |
| JP | 06-289175 A | 10/1994 |
| JP | 11-166996 A | 6/1999 |
| JP | 11-174189 A | 7/1999 |
| JP | 2004-333357 A | 11/2004 |
| JP | 2007-232420 A | 9/2007 |
| JP | 4340841 B2 | 10/2009 |
| JP | 2010-032526 A | 2/2010 |

* cited by examiner

PRIOR ART

CONTAINMENT VESSEL AND NUCLEAR POWER PLANT

TECHNICAL FIELD

The present invention relates to a containment vessel and a nuclear power plant provided with the containment vessel.

BACKGROUND ART

As a representative example of a conventional boiling water reactor (BWR), which has been put into practical use, there is known an advanced BWR (ABWR). Hereinafter, an outline of structures of a containment vessel and the like of the ABWR will be described with reference to FIG. 6 (see Patent Document 1, etc.)

In FIG. 6, a core 1 is accommodated inside a reactor pressure vessel (RPV) 2. A containment vessel (CV) 3 includes a cylindrical side wall (tubular side wall) 4, a top slab 5 closing an upper portion of the cylindrical side wall 4, a containment vessel head 6 provided at a center portion of the top slab 5, and a base mat 7 supporting the above components and closing a lower portion of the cylindrical side wall 4. The above components are designed so as to withstand a pressure rise upon occurrence of a design basis accident and constitute a pressure boundary. An inner space of the containment vessel 3 is partitioned into a dry well (DW) 8 accommodating the reactor pressure vessel 2 and a suppression chamber (wet well) (WW) 9.

The reactor pressure vessel 2 is supported by a vessel support 10 through a vessel skirt 11. A part of a space inside the dry well 8 above the vessel skirt 11 is referred to as an upper dry well 12, and a part of the space inside the dry well 8 below the vessel skirt 11 is referred to as a lower dry well 13. The suppression chamber 9 is installed so as to circumferentially surround the lower dry well 13 and has, inside thereof, a suppression pool (ST) 14. The dry well 8 and the suppression pool 14 are connected to each other by vent pipes 15.

The dry well 8 and the wet well 9 have an integral structure having a cylindrical shape to constitute the containment vessel 3. A horizontal floor separating the dry well 8 and the wet well 9 from each other is referred to as a diaphragm floor 16. The containment vessel 3 has a design pressure of 3.16 kg/cm$^2$ in gauge pressure. The cylindrical side wall 4 and the top slab 5 are formed of reinforced concrete with thicknesses of about 2 m and about 2.4 m, respectively. Inner surfaces of the cylindrical side wall 4 and the top slab 5 are each lined with a steel liner (not illustrated) for the purpose of suppressing leakage of radioactive materials. The base mat 7 is formed of reinforced concrete with a thickness of about 5 m.

In FIG. 6, an edge line of the cylindrical side wall 4 representing a joint part between the cylindrical side wall 4 and the top slab 5 is extended to a topmost potion of the containment vessel 3 for making a boundary therebetween easy to understand. Actually, there may be a case where the top slab 5 is placed on the cylindrical side wall 4. Alternatively, since both the cylindrical side wall 4 and the top slab 5 are formed of reinforced concrete, there may be a case where the joint part between the cylindrical side wall 4 and the top slab 5 constitutes a common part (continuous structure) to make the boundary obscure. The containment vessel in which the primary structures are formed of reinforced concrete is generally referred to as RCCV.

The containment vessel head 6 is formed of a steel so as to be capable of being removed upon refueling. Recently, there exists a type in which a water shield pool (not illustrated) is arranged above the containment vessel head 6. Further, recently, there exists a type in which a cooling water pool (not illustrated) of a passive safety system is arranged above the top slab 5. A design leak rate of the containment vessel 3 is about 0.5%/day In recent years, a plan is being studied in which the cylindrical side wall 4 and the top slab 5 are each not formed of the reinforced concrete but of a steel concrete composite (SC composite). The SC composite is obtained by filling concrete between two steel plates. The use of the SC composite eliminates the need of laying rebar and allows module construction. There is known, as an example in which the SC composite is adopted to a nuclear power plant, a shield building of AP1000 made by Toshiba/Westinghouse.

PRIOR ART DOCUMENT

Patent Document

Patent Document 1: Japanese Patent Application Laid-Open Publication No. 2004-333357

SUMMARY OF THE INVENTION

Problems to be Solved by the Invention

It is widely admitted today that, of all the radioactive materials released from the core upon occurrence of a design basis accident, particulate radioactive materials cause most serious radiation exposure damage to environment. Above all, particulate radioactive iodine inflicts maximal damage. The particulate radioactive materials have high water solubility and are thus difficult to leak from a water sealed portion. It is appreciated that radioactive noble gas and the like diffuse in the atmosphere even if they leak at a design leak rate to contribute less to the radiation exposure. Therefore, in order to reduce exposure dose upon occurrence of a design basis accident, it is important to minimize leakage of the particulate radioactive materials.

A conventional ABWR has a structure in which water is pooled above the top slab and the containment vessel head, so that even if a design basis accident occurs to cause the particulate radioactive materials to be released inside the containment vessel, the released particulate radioactive materials are difficult to leak. Further, storage of pool water in the suppression pool makes it difficult for the particulate radioactive materials to leak. Furthermore, upon occurrence of a design basis accident, coolant flowing out from the reactor pressure vessel is pooled in the lower dry well, so that the particulate radioactive materials are difficult to leak from the lower dry well.

Thus, it is the particulate radioactive materials leaking to environment through the tubular side wall having no water sealing effect that increase the exposure dose. In particular, a number of penetrations for electric systems or piping are formed in the cylindrical side wall and, actually, the leakage through the cylindrical side wall accounts for the most part of the design leak rate of the containment vessel. Thus, in order to reduce the exposure dose upon occurrence of a design basis accident, it is necessary to prevent the particulate radioactive materials leaking through the cylindrical side wall from being released to environment.

The conventional ABWR is designed to apply filtering to the particulate radioactive materials upon occurrence of a design basis accident by using a standby gas treatment system (not illustrated). However, a loss of power may occur under actual severe accident conditions to stop the standby gas treatment system, so that there is a possibility that an excessive amount of the particulate radioactive materials are released to environment.

Further, under severe accident conditions, a large amount of hydrogen is generated from core fuel by metal-water reaction, with the result that an internal pressure of the containment vessel 3 rises to a design pressure or more (about double the design pressure). More specifically, non-condensable gases such as a large amount of hydrogen generated from the core fuel and nitrogen existing before occurrence of the accident pass through the vent pipes 15, accompanied by steam in the dry well 8 to the suppression pool 14 where the non-condensable gases are pushed into a gas phase of the wet well 9 to be compressed, causing the internal pressure of the containment vessel 3 to rise. A pressure of the steam in the dry well 8 is slightly higher than the pressure caused by the compression of the non-condensable gases in the gas phase of the wet well 9. Under such a high-pressure condition, there is a possibility that leakage from the containment vessel 3 exceeds the design leak rate.

An object of the present invention is to suppress, without relying on an external power source, the particulate radioactive materials from being released to environment upon occurrence of a reactor accident and to restrict an internal pressure of the containment vessel to a design pressure or less for ensuring safety.

Means for Solving the Problem

In order to achieve the object, according to an aspect of the present invention, there is provided a containment vessel comprising: a horizontally-extending base mat supporting a load of a reactor pressure vessel accommodating a core; an inner shell disposed on the base mat so as to gas-tightly cover the reactor pressure vessel; and an outer shell disposed on the base mat so as to horizontally cover an outer periphery of the inner shell in an gas-tight manner, the inner shell including: a first cylindrical side wall having a lower end connected to the base mat and an upper end located higher than at least an upper end of the core and horizontally surrounding a periphery of the reactor pressure vessel; a containment vessel head covering an upper portion of the reactor pressure vessel; a first top slab gas-tightly connecting a periphery of the containment vessel head and an upper end portion of the first cylindrical side wall; a dry well constituting a part of the first cylindrical side wall and accommodating the reactor pressure vessel; and a wet well constituting a part of the first cylindrical side wall and accommodating a suppression pool connected to the dry well through a vent pipe, the outer shell including: a second cylindrical side wall having a lower end connected to the base mat and surrounding an outer periphery of the first cylindrical side wall; a second top slab gas-tightly connecting an upper end of the second cylindrical side wall and the inner shell; and an outer well which is a space gas-tightly surrounded by the second cylindrical side wall, the second top slab, and the base mat.

According to another aspect of the present invention, there is provided a nuclear power plant comprising a containment vessel including: a horizontally-extending base mat supporting a load of a reactor pressure vessel accommodating a core; an inner shell disposed on the base mat so as to gas-tightly cover the reactor pressure vessel; and an outer shell disposed on the base mat so as to horizontally cover an outer periphery of the inner shell in an gas-tight manner, the inner shell including: a first cylindrical side wall having a lower end connected to the base mat and an upper end located higher than at least an upper end of the core and horizontally surrounding a periphery of the reactor pressure vessel; a containment vessel head covering an upper portion of the reactor pressure vessel; a first top slab gas-tightly connecting a periphery of the containment vessel head and an upper end portion of the first cylindrical side wall; a dry well constituting a part of the first cylindrical side wall and accommodating the reactor pressure vessel; and a wet well constituting a part of the first cylindrical side wall and accommodating a suppression pool connected to the dry well through a vent pipe, the outer shell including: a second cylindrical side wall having a lower end connected to the base mat and surrounding an outer periphery of the first cylindrical side wall; a second top slab gas-tightly connecting an upper end of the second cylindrical side wall and the inner shell; and an outer well which is a space gas-tightly surrounded by the second cylindrical side wall, second top slab, and base mat.

Advantages of the Invention

According to the present invention, the double confinement function allows the particulate radioactive materials released from the core fuel upon occurrence of the reactor accident to be confined in the containment vessel without relying on an external power source.

EMBODIMENTS FOR CARRYING OUT THE INVENTION

Figure 1:
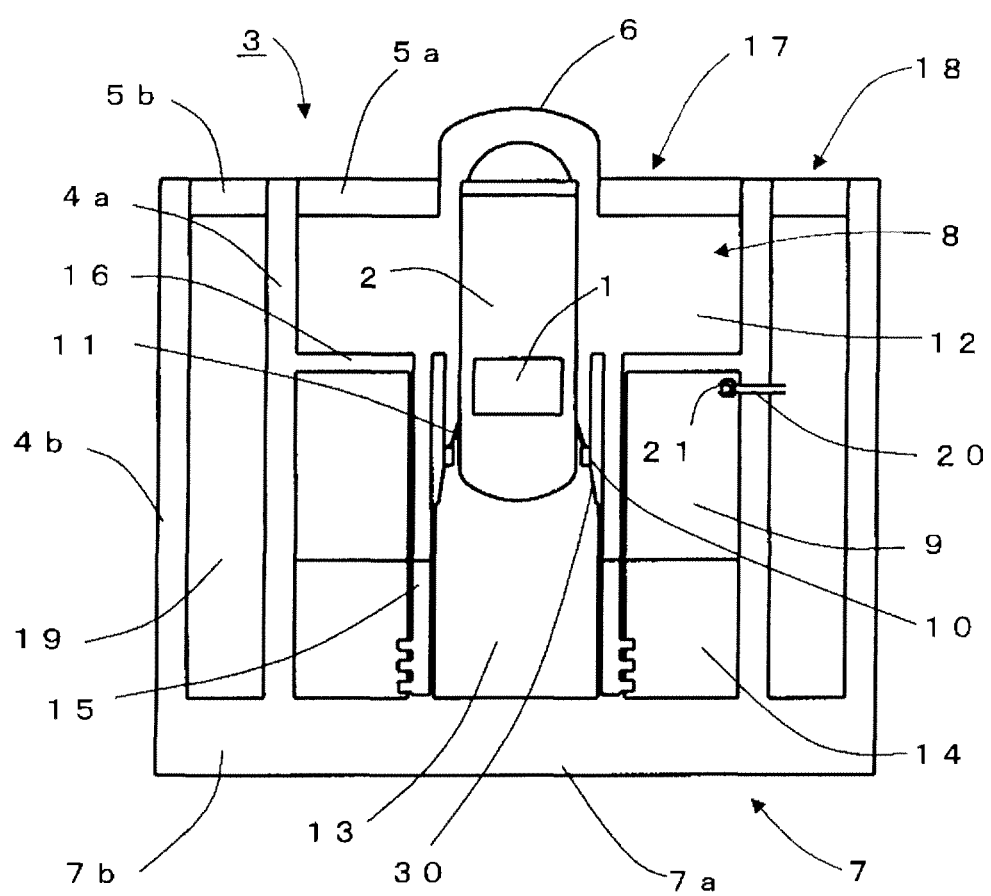
FIG. 1 is an elevational cross-sectional view illustrating a containment vessel according to a first embodiment of the present invention.

Embodiments of the present invention will be described based on FIGS. 1 to 5. In FIGS. 1 to 5, the same reference numerals are given to the same or similar components as in FIG. 6, so a description thereof will be omitted and only the essential elements will be explained.

[First Embodiment]

A first embodiment of a containment vessel (CV) according to the present invention will be described with reference to FIG. 1. FIG. 1 is an elevational cross-sectional view illustrating a containment vessel according to the first embodiment of the present invention.

The first embodiment of the present invention differs from the above conventional example in that a tubular side wall of a containment vessel 3 is doubled. More specifically, the tubular side wall is constituted by a first cylindrical side wall 4a, and a second cylindrical side wall 4b which is formed so as to surround the first cylindrical side wall 4a with a predetermined interval therebetween. Further, a second top slab 5b is installed so as to cover an upper portion of the second cylindrical side wall 4b. The second cylindrical side wall 4b and the second top slab 5b also constitute a pressure boundary, a design pressure of which is about 2.11 kg/cm$^2$ to about 3.16 kg/cm$^2$ in gauge pressure. An upper portion of the first cylindrical side wall 4a is covered by a first top slab 5a and a containment vessel head 6. A design pressure of this portion is about 3.16 kg/cm$^2$ in gauge pressure.

A structure constituted by the first cylindrical side wall 4a, first top slab 5a, containment vessel head 6, and a segment 7a of a horizontally-extending base mat 7 that is located directly below the first cylindrical side wall 4a, first top slab 5a, and the containment vessel head 6 is referred to as inner shell 17. On the other hand, a structure constituted by the second cylindrical side wall 4b, second top slab 5b, and a segment 7b of the horizontally-extending base mat 7 that is located directly below the second cylindrical side wall 4b and the second top slab 5b is referred to as outer shell 18. Further, a space surrounded by outer surfaces of the first cylindrical side wall 4a, second top slab 5b, and the second cylindrical side wall 4b and the part 7b of the base mat 7 that is located directly below the first cylindrical side wall 4a, second top slab 5b, and the second cylindrical side wall 4b is referred to as outer well 19.

FIG. 1 illustrates a case where the second top slab 5b is located at the same height position as the first top slab 5a. Although FIG. 1 illustrates an example in which the first and second top slabs 5a and 5b are joined to the first cylindrical side wall 4a from both sides thereof, the joining method is not limited to this. For example, a joining method may be adopted in which the first and second top slabs 5a and 5b are joined to each other in a horizontal direction, and an upper end of the first cylindrical side wall 4a is connected to a lower portion of the joined top slabs 5a and 5b. Further, alternatively, the first and second top slabs 5a and 5b and the first cylindrical side wall 4a may be joined together such that the joint part therebetween constitute a continuous common part therebetween.

An inner space of the inner shell 17 is partitioned into a dry well (DW) 8 accommodating a reactor pressure vessel (RPV) 2 and a wet well (suppression chamber, WW) 9. The reactor pressure vessel 2 is supported by a vessel support 10 through a vessel skirt 11. The vessel support 10 is supported by the base mat 7 through a cylindrical pedestal 30. That is, a load of the reactor pressure vessel 2 is finally supported by the base mat 7.

Apart of a space inside the dry well 8 above the vessel skirt 11 is referred to as an upper dry well 12, and a part of the space inside the dry well 8 below the vessel skirt 11 is referred to as a lower dry well 13. The wet well 9 is installed so as to circumferentially surround the lower dry well 13 and has, inside thereof, a suppression pool (SP) 14. The dry well 8 and the wet well 9 are partitioned by a partition wall including a diaphragm floor 16. The dry well 8 and the suppression pool 14 are connected to each other by vent pipes 15.

The dry well 8 and the wet well 9 constitute, as a whole, a cylindrical space surrounded by the first cylindrical side wall 4a. The first cylindrical side wall 4a serves as outer walls of the upper dry well 12 and the wet well 9.

In the present embodiment, heights of the reactor pressure vessel 2 and the wet well 9 are slightly increased as compared to those of the conventional ABWR so that the upper end of the core 1 is located at the same height or lower than the diaphragm floor 16.

A gas-phase vent pipe 20 connecting a gas phase portion of the wet well 9 and the outer well 19 is provided. An isolation and connection switching system (ICSS) 21 is provided at an inlet of the gas-phase vent pipe 20. The isolation and connection switching system 21 is configured to be closed during normal operation of the reactor and be opened upon occurrence of an accident. For example, as the isolation and connection switching system 21, a rupture disk, a vacuum break valve, and an automatic isolation valve are available.

The rupture disk is designed to be actuated to break the disk-shaped partition plate arranged in a pipe and allow communication with the atmosphere when a predetermined pressure difference takes place, and does not have isolation or closure function after the actuation. In other words, atmosphere can flow forwardly or backwardly through the rupture disk depending on the pressure difference after the actuation.

The vacuum break valve is a highly reliable gas-phase check valve. The vacuum break valve is designed to be actuated to allow communication with the atmosphere when a predetermined pressure difference takes place but become closed to shut off the flow path when the pressure difference becomes small. The atmosphere can flow forwardly through the vacuum break valve but not backwardly. It is typically used when the forward communication feature and the backward isolation feature need to be realized highly reliably.

The automatic isolation valve is typically a motor-driven valve or pneumatically driven valve that is designed to be automatically opened and closed when a predetermined pressure difference takes place. It can be held to an open state and returned to a closed state after it is opened. If it is a motor-driven valve, it will take some time for actuation. If it is a pneumatically driven valve, it is actuated quickly but an accumulator is required.

It is a matter of choice in a design phase which type of the isolation and connection switching system is to be selected. The functional feature that is common to the above-described types of isolation and connection switching system 21 is that they normally provide an isolated state but begin to allow the atmosphere to flow forwardly when a predetermined pressure difference takes place.

In other words, any of the above-listed isolation and connection switching systems 21 provide an isolated state when the nuclear reactor is operating normally and the gas phase portion of the wet well 9 and the outer well 19 are separated. Additionally, the isolation and connection switching system 21 will maintain an isolated state if a transient or a small scale loss-of-coolant accident not accompanied by a pressure rise in the gas phase portion of the wet well 9 occurs. As a result, the transient or small scale loss-of-coolant accident can be confined to the inner shell 17. To this end, the first tubular side wall 4a does not have an opening portion other than the gas-phase vent pipe 20.

On the other hand, when a large break loss-of-coolant accident or a severe accident occurs, the pressure of the gas-phase portion of the wet well 9 rises. When the pressure has risen to reach the pressure difference for actuating the isolation and connection switching system 21, the isolation and connection switching system 21 is opened, which brings the gas-phase portion of the wet well 9 and the outer well 19 into communication with each other. Then, as a result, the pressure rise in the inner shell 17 caused by the non-condensable gas, such as hydrogen and nitrogen, accumulated in the gas-phase portion of the wet well 9 is released into the inside of the outer shell 18, thereby significantly mitigating the pressure rise in the containment vessel 3.

Further, a large amount of hydrogen is released to the inside of the containment vessel 3 upon occurrence of a severe accident, so that hydrogen detonation can take place if the atmosphere in the containment vessel 3 is air. In order to eliminate such a risk, the atmosphere inside the containment vessel 3, including the outer well 19, is replaced by nitrogen so as to be held in a state where oxygen concentration is lower than that of ordinary air.

In the present embodiment, although not illustrated in FIG. 1, a fuel pool 27 (see FIG. 5) is arranged above the first and second top slabs 5*a* and 5*b*. Further, a water shield 28 (see FIG. 5) is arranged above the containment vessel head 6.

In the present embodiment, it is possible to maintain the internal pressure of the containment vessel low upon occurrence of a severe accident. The volume of the free space in the outer well 19 is about four times the volume of the free space in the wet well 9. Therefore, the internal pressure of the containment vessel can be suppressed to a quarter of the conventional level at the severe accident. Thus, it is possible to easily reduce the pressure at the severe accident to the design pressure level or less.

Further, according to the present embodiment, in the case of a small-scale accident where the isolation and connection switching system 21 is not opened, the radioactive materials are confined by the double confinement structure having the first cylindrical side wall 4*a* and the second cylindrical side wall 4*b*, thereby suppressing the radioactive materials from being released to environment. Further, in a case of an accident severe enough to open the isolation and connection switching system 21, the internal pressure of the inner shell 17 and that of the outer well 19 are equalized, with the result that a pressure difference between the inside and outside of the first cylindrical side wall 4*a* becomes negligible, thereby preventing the particulate radioactive materials floating in the dry well 8 from directly leaking through the first cylindrical side wall 4*a*. The particulate radioactive materials floating in the dry well 8 is guided to the inside of the suppression pool 14 through the vent pipes 15 to be dissolved in the suppression pool water, so that only a minute amount of the particulate radioactive materials are moved to the wet well gas phase portion. Then, the minute amount of the particulate radioactive materials are moved to the outer well 19 through the isolation and connection switching system 21 but are confined by the outer shell 18, thereby substantially completely eliminate the leakage to environment.

Although a large amount of hydrogen is moved to the outer well 19 upon occurrence of a severe accident, the atmosphere in the outer well 19 is replaced by the nitrogen to limit oxygen concentration to a low level, thereby eliminating the risk of occurrence of the hydrogen detonation.

As described above, according to the present embodiment, a large amount of particulate radioactive materials released from the core fuel upon occurrence of an accident can be confined inside the containment vessel by the double confinement function. The radioactive materials can be confined inside the containment vessel without an external power source but only with a passive means, so that even if a severe accident occurs resulting from a natural disaster such as a giant earthquake, it is possible to ensure safety of surrounding habitants without need of evacuation. A pressure rise in the containment vessel caused by a large amount of hydrogen generated from the core upon occurrence of a severe accident can be suppressed to a low level, so that even if the severe accident condition continues for a long time, it is possible to prevent occurrence of overpressure breakage of the containment vessel and excessive leakage.

[Second Embodiment]

Figure 2:
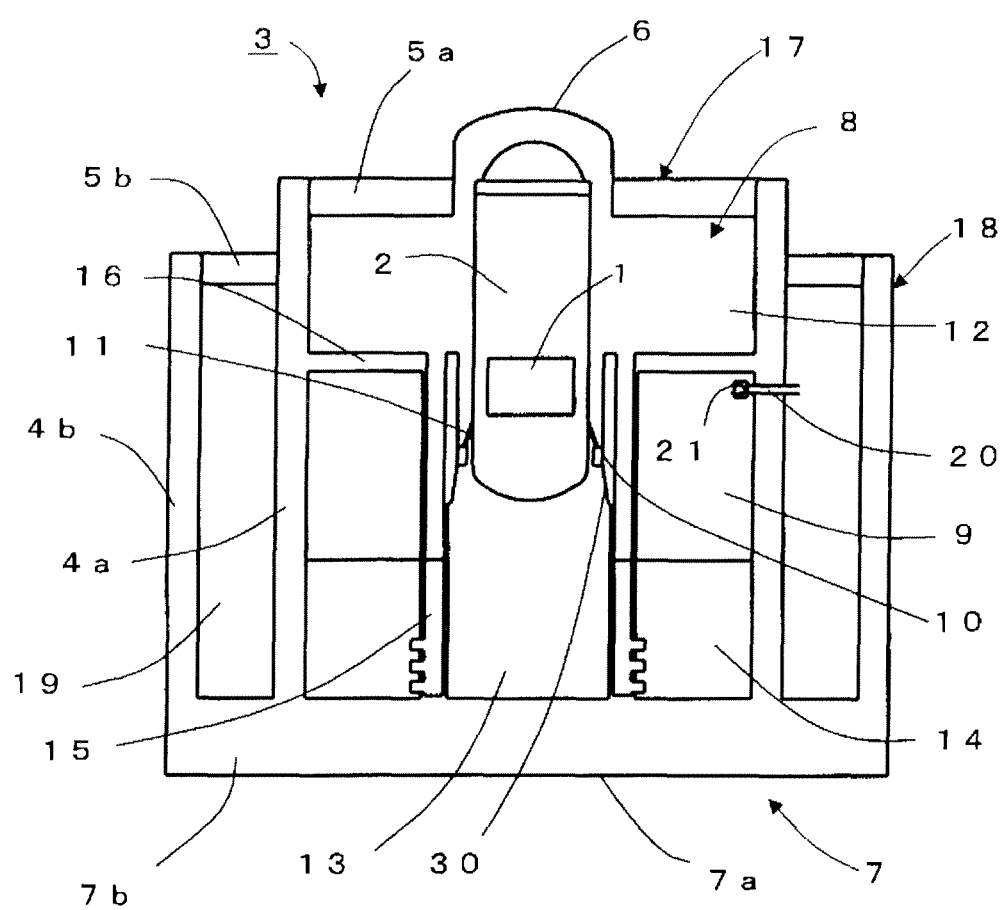
FIG. 2 is an elevational cross-sectional view illustrating a containment vessel according to a second embodiment of the present invention.

FIG. 2 is an elevational cross-sectional view illustrating a containment vessel according to a second embodiment of the present invention. In the present embodiment, an upper end of the second cylindrical side wall 4*b* is located lower than that of the first cylindrical side wall 4*a*, and the second top slab 5*b* extends horizontally at a position lower than the first top slab 5*a*. In an example illustrated in FIG. 2, the second top slab 5*b* is joined to the first cylindrical side wall 4*a*. The joint part between the second top slab 5*b* and the first cylindrical side wall 4*a* may constitute a common part therebetween.

In the present embodiment, when a fuel pool 27 (see FIG. 5) is arranged above the first and second top slabs 5*a* and 5*b*, a part of the fuel pool 27 that is located above the second top slab 5*b* can be made deeper than a part of the fuel pool 27 that is located above the first top slab 5*a*.

[Third Embodiment]

Figure 3:
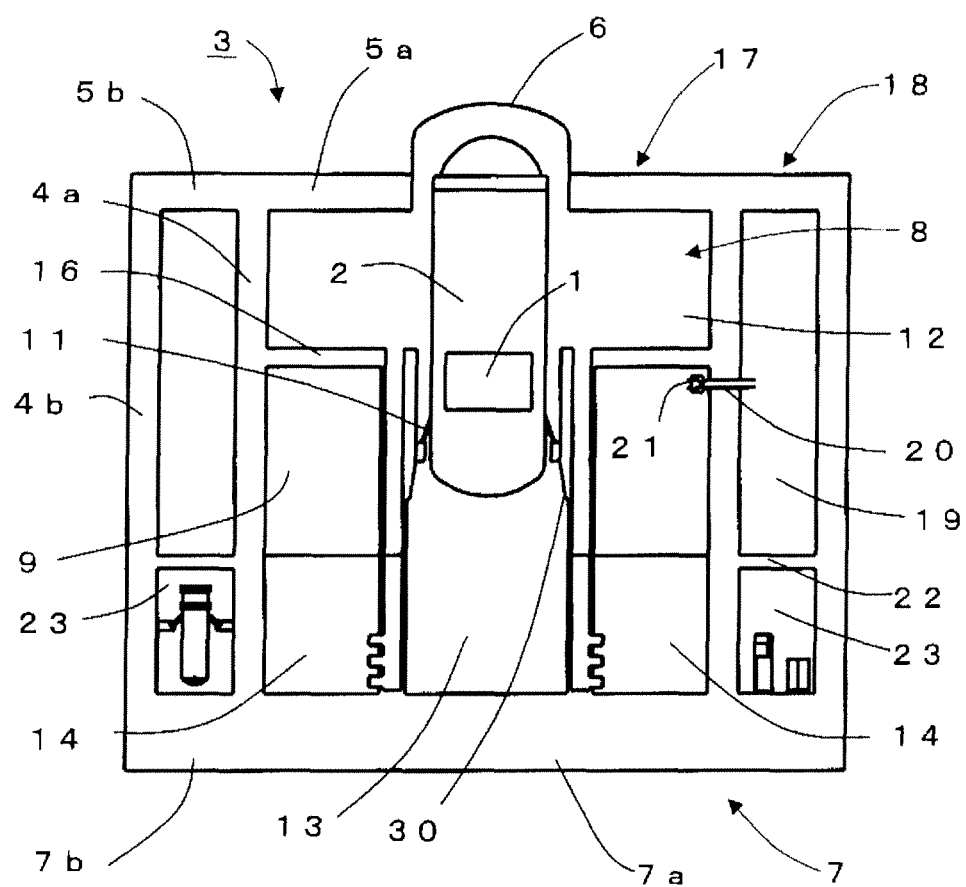
FIG. 3 is an elevational cross-sectional view illustrating a containment vessel according to a third embodiment of the present invention.

FIG. 3 is an elevational cross-sectional view illustrating a containment vessel according to a third embodiment of the present invention. In the present embodiment, a part of the outer well 19 is partitioned by a pressure-tight partition wall 22 to form an equipment room 23 with air atmosphere. In the equipment room 23, equipment such as residual heat removal system heat exchangers or panels for various electrical facilities can be installed. Other configurations are the same as those of the first embodiment.

A volume of the outer well 19 is sufficiently large, so that a part of the outer well 19 can be used as the equipment room 23. In particular, the particulate radioactive materials do not leak outside the suppression pool 14 due to water sealing effect of the suppression pool water, so that it is effective to use this area as the equipment room 23. Further, in the present embodiment, the same effects as those in the first embodiment can be obtained.

[Fourth Embodiment]

Figure 4:
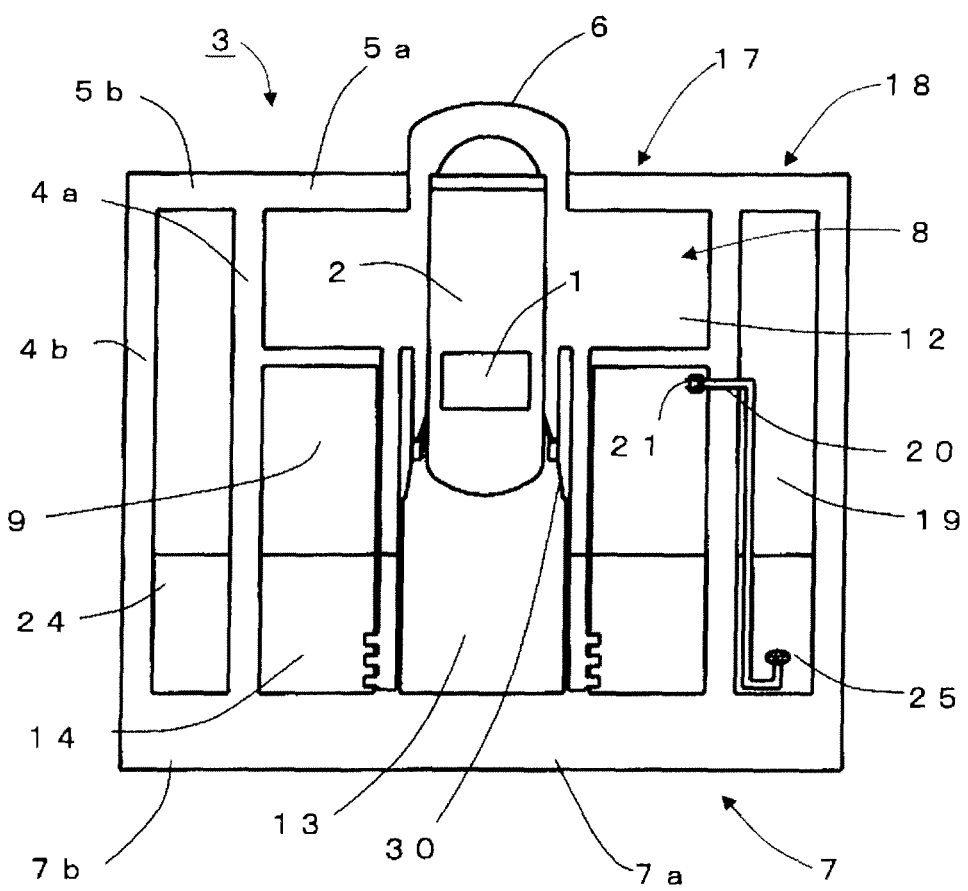
FIG. 4 is an elevational cross-sectional view illustrating a containment vessel according to a fourth embodiment of the present invention.

FIG. 4 is an elevational cross-sectional view illustrating a containment vessel according to a fourth embodiment of the present invention. In the present embodiment, an outer pool 24 is provided at a lower portion of the outer well 19, a leading end of the gas-phase vent pipe 20 is guided to the water in the outer pool 24, and a scrubbing nozzle 25 is attached to the leading end portion of the gas-phase vent pipe 20. Other configurations are the same as those of the first embodiment.

The scrubbing nozzle 25 is, e.g., a venturi nozzle. For example, as the venturi nozzle, one similar to a scrubbing nozzle of FILTRA MVSS developed against a severe accident in a Swedish BWR plant may be adopted.

The outer pool 24 is separated from the suppression pool 14 by the first cylindrical side wall 4*a* so as to prevent the water from being circulated and mixed between them.

According to the present embodiment, when the isolation and connection switching system 21 is opened upon occurrence of a reactor accident, high-pressure gas in the wet well 9 is guided to the water in the outer pool 24 through the gas-phase vent pipe 20. At this time, fine bubbles are generated in the water of the outer pool 24 by the scrubbing nozzle 25, and a minute amount of the particulate radioactive materials floating in the gas phase of the wet well 9 are dissolved in the water pooled in the outer pool 24.

According to the fourth embodiment, it is possible not only to obtain the same effects as those in the first embodiment, but also to further suppress the particulate radioactive materials from leaking outside from the outer well 19.

A medication such as sodium hydroxide that increases the dissolving property of iodine may be mixed in the water of the outer pool 24. This allows radioactive iodine to be dissolved in the water of the outer pool 24 more reliably.

Alternatively, non-radioactive iodine may be mixed in the water of the outer pool 24. In this case, when the radioactive iodine flows into the water of the outer pool 24, replacement reaction between the radioactive organic iodine and non-radioactive iodine takes place, thereby efficiently eliminating the radioactive organic iodine.

[Fifth Embodiment]

Figure 5:
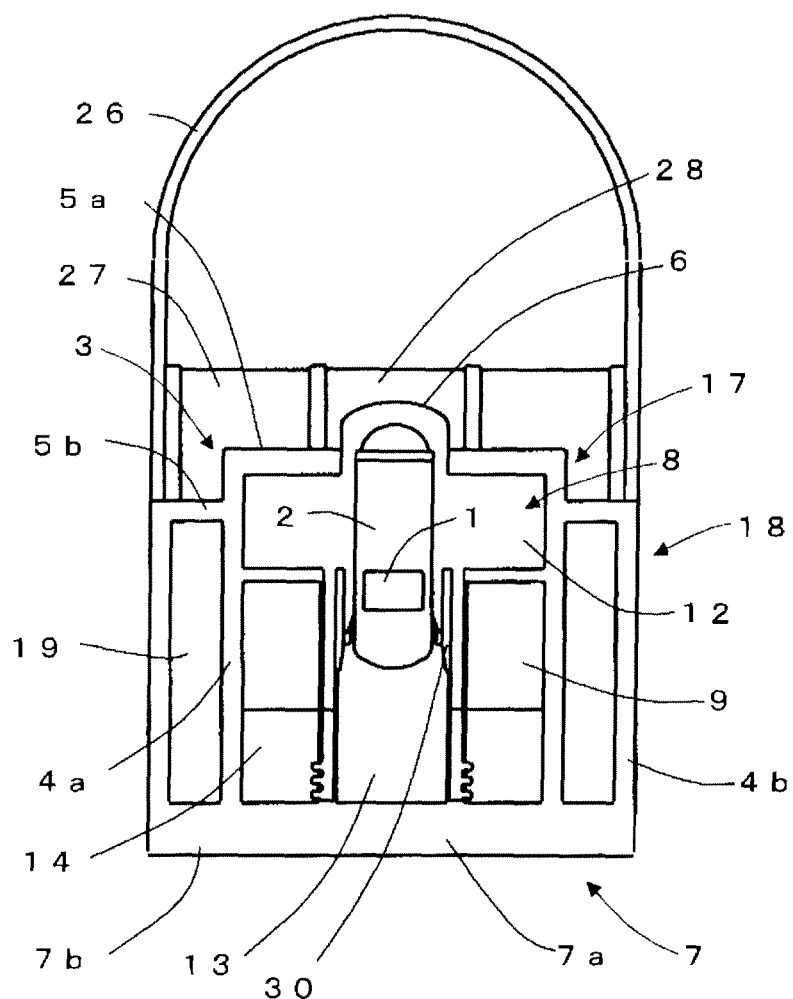
FIG. 5 is an elevational cross-sectional view illustrating a nuclear power plant according to a fifth embodiment of the present invention.
Figure 6:
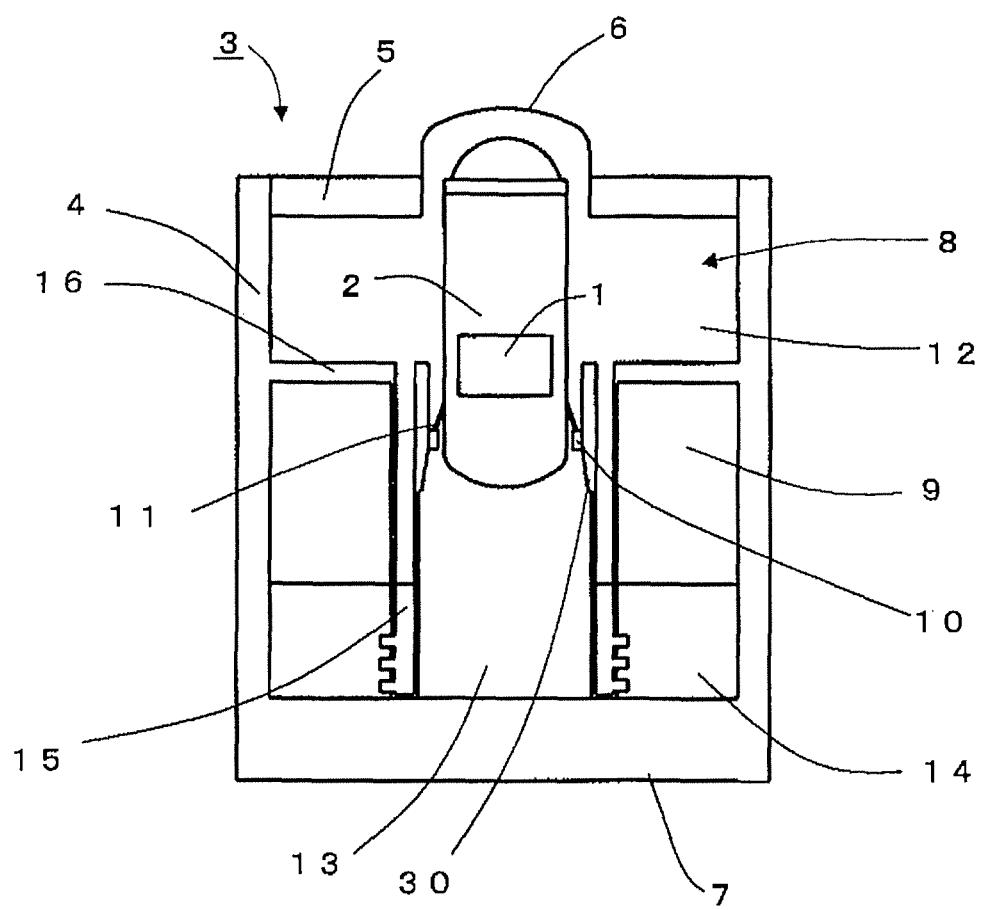
FIG. 6 is an elevational cross-sectional view illustrating an example of a containment vessel of a conventional ABWR.

FIG. 5 is an elevational cross-sectional view illustrating a nuclear power plant according to a fifth embodiment of the present invention.

In the present embodiment, an upper protective barrier 26 against airplane crash is installed so as to cover an upper portion of the containment vessel with the second cylindrical side wall 4b and the second top slab 5b of the containment vessel 3 of the second embodiment (FIG. 2) as a base. In FIG. 5, illustration of the gas-phase vent pipe 20 is omitted. The upper protective barrier 26 does not constitute the containment vessel 3 and is thus need not have pressure tightness.

Further, in the present embodiment, the fuel pool 27 is arranged above the first top slab 5a and the second top slab 5b, and the water shield 28 is arranged above the containment vessel head 6. The fuel pool 27 and the water shield 28 are located inside the upper protective barrier 26.

According to the present embodiment, it is possible to protect a passive safety system (not illustrated) and the fuel pool 27 arranged above the top slabs 5a and 5b of the containment vessel 3 against airplane crash accident.

A protective barrier against airplane crash that has conventionally been proposed is installed so as to rise from the base mat 7 and cover the entire outer periphery of the containment vessel 3 (e.g., double containment vessel). On the other hand, in the present embodiment, the protective barrier is installed on the second cylindrical side wall 4b, using the second cylindrical side wall 4b as a part of thereof, so that it is possible to significantly reduce cost and amount of material. The second cylindrical side wall 4b has a pressure-tight structure and thus serves as the protective barrier against airplane crash by itself, thereby eliminating the need to additionally provide a protective barrier for protecting the side wall portion. That is, according to the present embodiment, the containment vessel 3 itself is protected by the outer shell 18, thus eliminating the need to additionally provide a protective barrier for protecting the side wall portion.

[Other Embodiments]

The above embodiments are merely illustrative, and the present invention is not limited thereto.

For example, the features of the respective embodiments can be combined together in very different ways. More specifically, although the upper protective barrier 26 and the like are added to the containment vessel of the second embodiment to achieve the fifth embodiment, the upper protective barrier 26 may be added to the containment vessels of the first, third, or fourth embodiments.

Further, the gas-phase vent pipe 20 may be omitted in the first, second, third, and fifth embodiments.

EXPLANATION OF SYMBOLS

1: Core
2: Reactor pressure vessel (RPV)
3: Containment vessel (CV)
4: Cylindrical side wall
4a: First cylindrical side wall
4b: Second cylindrical side wall
5: Top slab
5a: First top slab
5b: Second top slab
6: Containment vessel head
7: Basemat
8: Dry well (DW)
9: Wet well (suppression chamber, WW)
10: Vessel support
11: Vessel skirt
12: Upper DW
13: Lower DW
14: Suppression pool (SP)
15: Vent pipe
16: Diaphragm floor
17: Inner shell
18: Outer shell
19: Outer well
20: Gas-phase vent pipe
21: Isolation and connection switching system (ICSS)
22: Partition wall
23: Equipment room
24: Outer pool
25: Scrubbing nozzle
26: Upper protective barrier
27: Fuel pool
28: Water shield
30: Pedestal

What is claimed is:

1. A containment vessel comprising:
a horizontally-extending base mat supporting a load of a boiling water reactor pressure vessel accommodating a core;
an inner shell disposed on the base mat so as to gas-tightly cover the boiling water reactor pressure vessel; and
an outer shell disposed on the base mat so as to horizontally cover only an outer periphery of the inner shell in a gas-tight manner, the outer shell not covering the whole inner shell,
the inner shell including:
  a first cylindrical side wall having a lower end connected to the base mat and an upper end located higher than at least an upper end of the core and horizontally surrounding a periphery of the boiling water reactor pressure vessel;
  a containment vessel head covering an upper portion of the boiling water reactor pressure vessel and being formed of a steel so as to be capable of being removed upon refueling;
  a first top slab gas-tightly connecting a periphery of the containment vessel head and an upper end portion of the first cylindrical side wall;
  a dry well constituting a part of the first cylindrical side wall and accommodating the boiling water reactor pressure vessel;
  a wet well constituting a part of the first cylindrical side wall;
  a suppression pool accommodated in the wet well; and
  a vent pipe connecting the dry well to the suppression pool, the outer shell including:
  a second cylindrical side wall having a lower end connected to the base mat and surrounding an outer periphery of the first cylindrical side wall in a gas-tight manner, a top of the second cylindrical side wall being not higher than a top of the first top slab;
  a second top slab gas-tightly connecting an upper end of the second cylindrical side wall and the inner shell, the second cylindrical side wall not extending above the second top slab; and an outer well which is a space gas-tightly surrounded by the second cylindrical side wall, the second top slab, and the base mat, an atmosphere in the outer well being replaced by nitrogen to make an oxygen concentration lower than ordinary air, wherein the second cylindrical side wall and the second top slab form a pressure boundary.

2. The containment vessel according to claim 1, further comprising:

a gas-phase vent pipe connecting a gas-phase portion of the wet well and the outer well; and an isolation and connection switching system mounted to the gas-phase vent pipe and configured to be closed during reactor normal operation and be opened upon occurrence of a reactor accident.

3. The containment vessel according to claim 1, wherein atmosphere in the dry well and the wet well and atmosphere in at least some space in the outer well are replaced by nitrogen to make an oxygen concentration lower than air during reactor normal operation.

4. The containment vessel according to claim 3, wherein a part of the outer well is partitioned to form an equipment room with air atmosphere, and atmosphere in the outer well excluding the equipment room during reactor normal operation is replaced by nitrogen to make an oxygen concentration lower than normal air.

5. The containment vessel according to claim 1, wherein an outer pool in which pool water is pooled is provided in lower part of the outer well.

6. The containment vessel according to claim 5, further comprising a gas-phase vent pipe connecting a gas-phase portion of the wet well and the outer well, wherein a leading end of the gas-phase vent pipe is disposed in the pool water of the outer pool.

7. The containment vessel according to claim 6, wherein a scrubbing nozzle is attached to a leading end of the gas-phase vent pipe.

8. The containment vessel according to claim 5, wherein a medication that increases a dissolving property of radioactive iodine is mixed in the pool water of the outer pool.

9. The containment vessel according to claim 5, wherein non-radioactive iodine is mixed in the pool water of the outer pool.

10. A nuclear power plant comprising:

a core;

a boiling water reactor pressure vessel accommodating the core; and a containment vessel including:

a horizontally-extending base mat supporting a load of the boiling water reactor pressure vessel accommodating the core;

an inner shell disposed on the base mat so as to gas-tightly cover the boiling water reactor pressure vessel; and an outer shell disposed on the base mat so as to horizontally cover only an outer periphery of the inner shell in a gas-tight manner, the outer shell not covering the whole inner shell, the inner shell including:

a first cylindrical side wall having a lower end connected to the base mat and an upper end located higher than at least an upper end of the core and horizontally surrounding a periphery of the boiling water reactor pressure vessel;

a containment vessel head covering an upper portion of the boiling water reactor pressure vessel and being formed of a steel so as to be capable of being removed upon refueling;

a first top slab gas-tightly connecting a periphery of the containment vessel head and an upper end portion of the first cylindrical side wall;

a dry well constituting a part of the first cylindrical side wall and accommodating the boiling water reactor pressure vessel;

a wet well constituting a part of the first cylindrical side wall;

a suppression pool accommodated in the wet well; and a vent pipe connecting the dry well to the suppression pool, the outer shell including:

a second cylindrical side wall having a lower end connected to the base mat and surrounding an outer periphery of the first cylindrical side wall in a gas-tight manner, a top of the second cylindrical side wall being not higher than a top of the first top slab;

a second top slab gas-tightly connecting an upper end of the second cylindrical side wall and the inner shell, the second cylindrical side wall not extending above the second top slab; and an outer well which is a space gas-tightly surrounded by the second cylindrical side wall, the second top slab, and the base mat, an atmosphere in the outer well being replaced by nitrogen to make an oxygen concentration lower than ordinary air, wherein the second cylindrical side wall and the second top slab form a pressure boundary.

11. The nuclear power plant according to claim 10, wherein a fuel pool is arranged above the first and second top slabs.

12. The nuclear power plant according to claim 10, wherein an upper protective barrier covering an upper portion of the containment vessel is provided.

* * * * *